(12) United States Patent
Wierzchon

(10) Patent No.: US 11,872,667 B2
(45) Date of Patent: Jan. 16, 2024

(54) HAND-HELD POWER TOOL, EDGE GUIDE AND TOOL SYSTEM

(71) Applicant: Robert Bosch GmbH, Stuttgart (DE)

(72) Inventor: Peter Wierzchon, Morton Grove, IL (US)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 17/293,298

(22) PCT Filed: Nov. 12, 2019

(86) PCT No.: PCT/EP2019/080979
§ 371 (c)(1),
(2) Date: May 12, 2021

(87) PCT Pub. No.: WO2020/104247
PCT Pub. Date: May 28, 2020

(65) Prior Publication Data
US 2021/0394325 A1 Dec. 23, 2021

(30) Foreign Application Priority Data
Nov. 19, 2018 (DE) ...................... 10 2018 219 736.9

(51) Int. Cl.
*B27C 5/10* (2006.01)
*B23Q 9/00* (2006.01)

(52) U.S. Cl.
CPC .............. *B23Q 9/0028* (2013.01); *B27C 5/10* (2013.01)

(58) Field of Classification Search
CPC ........ B27C 5/10; B23Q 9/0014; B23Q 9/0028
See application file for complete search history.

(56) References Cited

U.S. PATENT DOCUMENTS

| 3,635,268 A | 1/1972 | Lange |
| 4,143,691 A | 3/1979 | Robinson |
| 2002/0187014 A1 | 12/2002 | Bergner et al. |

FOREIGN PATENT DOCUMENTS

| CN | 103878418 A | 6/2014 |
| DE | 36 12 214 A1 | 10/1987 |

(Continued)

OTHER PUBLICATIONS

On The Workbench, Porter Cable Compact Router Edge Guide, Aug. 15, 2017, https://www.youtube.com/watch?v=KVYMq6Q9IZI (Year: 2017).*

(Continued)

*Primary Examiner* — Matthew Katcoff
(74) *Attorney, Agent, or Firm* — Maginot, Moore & Beck LLP

(57) ABSTRACT

A hand-held power tool, in particular a router, includes a machine housing and a support device for guiding the hand-held power tool on a workpiece. The support device has a carrier element, in which the machine housing is at least partially received and fastened. A foot plate which allows an insert tool, in particular a milling tool, to pass through and which is designed to bear against a workpiece is fastened to an end flange of the carrier element facing away from the machine housing. An edge guide for guiding the hand-held power tool along an edge of the workpiece is fastenable to the end flange of the carrier element. A groove is formed in the end flange. A fastening portion of a holding arm of the edge guide can be received interlockingly in the groove and can be fastened by means of at least one fastening element.

11 Claims, 5 Drawing Sheets

(56) References Cited

FOREIGN PATENT DOCUMENTS

| | | |
|---|---|---|
| DE | 39 34 358 A1 | 4/1991 |
| DE | 195 36 133 A1 | 4/1997 |
| DE | 20 2009 006 799 U1 | 11/2009 |
| DE | 10 2017 205 565 A1 | 10/2018 |
| EP | 0 765 719 A1 | 4/1997 |
| EP | 1 375 060 A1 | 1/2004 |
| FR | 2 618 362 A3 | 1/1989 |
| WO | 2006/028436 A1 | 3/2006 |

OTHER PUBLICATIONS

Shaunte Yeakle, Shill Review: Bosch Colt | GKF 600 Professional Palm Router, Aug. 26, 2018, https://www.youtube.com/watch?v=ZPfcZPG-m5k (Year: 2018).*
The Tool Nut, DeWalt DCW600B 20V MAX XR Brushless Cordless Compact Router, Tool Only, Sep. 5, 2023, https://www.toolnut.com/dewalt-dcw600b-20v-max-xr-brushless-cordless-compact-router-tool-only.html (Year: 2023).*
Amazon, DNP613 Router Sub Base for DEWALT 20V Compact Routers Round Subbase, Adopts a Transparent Design Ensure Maximum Visibility in Operation—for DEWALT 611 Router Models (Round), Sep. 5, 2023 (Year: 2023).*
International Search Report corresponding to PCT Application No. PCT/EP2019/080979, dated Feb. 19, 2020 (German and English language document) (5 pages).

* cited by examiner

HAND-HELD POWER TOOL, EDGE GUIDE AND TOOL SYSTEM

This application is a 35 U.S.C. § 371 National Stage Application of PCT/EP2019/080979, filed on Nov. 12, 2019, which claims the benefit of priority to Serial No. DE 10 2018 219 736.9, filed on Nov. 19, 2018 in Germany, the disclosures of which are incorporated herein by reference in their entirety.

The present disclosure relates to a hand-held power tool, in particular a router, comprising a machine housing and a supporting device for guiding the hand-held power tool on a workpiece, wherein the supporting device has a carrier element in which the machine housing is at least in part accommodated and fastened, wherein to an end flange of the carrier element, which end flange is facing away from the machine housing, is fastened a base plate, which allows an insert tool, in particular a milling tool, to pass through it and which is designed to bear against a workpiece, and wherein to the end flange of the carrier element can be fastened an edge guide for guiding the hand-held power tool along an edge of the workpiece. The disclosure further relates to an appropriate edge guide and an associated tool system.

BACKGROUND

From the prior art, hand-held milling machines for woodworking, such as, for example, routers, are known in a wide range of variations. In order to obtain satisfactory work results, apparatuses for precisely guiding an appropriate router in relation to a workpiece to be machined by means of the router are generally necessary.

A multifunctional guide device for various hand-held power tools for woodworking, such as, for example, a belt grinder, a circular saw or a router, is known from EP 1 375 060 A1. The guide device comprises a guide plate, which can be fastened on a plate-like workpiece by means of a screw clamp. The hollow-chamber-like guide plate possesses on the top side a multiplicity of T-shaped guide grooves, which are arranged in parallel and evenly spaced. Where necessary, a solid guide bar having an L-shaped cross-sectional geometry can be inserted without play into the T-shaped guide grooves. On this guide bar, a bottom-side sliding shoe of a guide arm is accommodated in a longitudinally displaceable manner for the guidance of a hand-held power tool for woodworking, such as, for example, a router, wherein the guide arm is oriented at right angles to the direction of displacement of the sliding shoe on the guide bar. The guide arm can be locked steplessly in any chosen longitudinal position on the sliding shoe by a clamping device which can be actuated by a rotary knob. A supporting device of the router to be guided by means of the multifunctional guide device has two outwardly directed bores, oriented parallel to the guide arm, for the insertion of two pins of a hinged element for the at least temporary fastening of the hinged element to the supporting device of the router. At a free end of the guide arm, which end is directed away from the sliding shoe, said guide arm can be articulately connected to the hinged element, and thus to the supporting device of the router, by means of an insert shaft. When the guide plate is appropriately clamped to the workpiece to be machined, the multifunctional guide device thus enables a precise, edge-parallel guidance of a router, or a different hand-held power tool for woodworking, in relation to the workpiece.

SUMMARY

The present disclosure provides a hand-held power tool, in particular a router, comprising a machine housing and a supporting device for guiding the hand-held power tool on a workpiece, wherein the supporting device has a carrier element in which the machine housing is at least in part accommodated and fastened, wherein to an end flange of the carrier element, which end flange is facing away from the machine housing, is fastened a base plate, which allows an insert tool, in particular a milling tool, to pass through it and which is designed to bear against a workpiece, and wherein to the end flange of the carrier element can be fastened an edge guide for guiding the hand-held power tool along an edge of the workpiece. In the end flange is configured a groove, in which a fastening portion of a holding arm of the edge guide can be at least in part accommodated in a positive-locking manner and can be fastened by means of at least one fastening element.

The disclosure thus enables the provision of an edge guide produced in a simplified production process. It is merely necessary to make a preferably radially outwardly directed, rectangular groove, having at least one bore-like depression for a therein receivable fastening element, in the preferably annular end flange of the hollow-cylindrical carrier element of the supporting device, thereby resulting in a simplified production process. By virtue of the fastening elements, which are arranged, moreover, captively in a region between the base plate and the annular end flange, a simplified ease of handling for a user is given. The groove having a preferably rectangular cross-sectional geometry preferably has two parallel groove walls and a flat groove bottom, whereby production is further simplified.

Preferably, for the temporary fastening of the edge guide to the end flange of the carrier element of the supporting device, there is provided at least one fastening element, preferably configured as a threaded screw, which can be screwed into an associated threaded bore in a groove bottom of the groove. As a result, a twist-proof and robust fastening of the holding arm to the supporting device is given.

Preferably, a depth of the groove is dimensioned larger than a material thickness of the fastening portion of the holding arm. Consequently, the at least one threaded screw is able to be unscrewed at least sufficiently far out of the at least one threaded bore, without the risk of falling out, that the fastening portion of the holding arm is easily able to be introduced into the groove.

According to an advantageous refinement, the fastening portion of the holding arm has at least one through bore for the at least one threaded screw, and the at least one through bore merges into a longitudinal slot which is open toward a holding arm end. As a result, the holding arm of the edge guide can be easily introduced into the groove without the need to previously unscrew the fastening screws.

Preferably, the at least one longitudinal slot has a V-shaped chamfer and the at least one through bore has a countersink, wherein the chamfer and countersink are provided in the region of a bottom side of the fastening portion of the holding arm, which bottom side is facing away from the machine housing, and the countersink is configured deeper than the chamfer. As a result, the insertion of the fastening portion of the holding arm of the edge guide into the groove is further facilitated. The countersinks of the through bores are preferably configured approximately 0.5 mm to 1.0 mm deeper than the chamfers.

In an advantageous refinement, the base plate has at least one through bore for the feed-through, preferably with slight play, of a tool, in particular a screwdriver, for securing the at least one fastening screw, wherein a diameter of this through bore is smaller than a head diameter of the at least one threaded screw and the at least one through bore of the base plate is configured centrically and above the at least one threaded bore of the groove bottom. Consequently, the threaded screws can be captively mounted between the base plate and the groove bottom of the groove of the annular end portion of the carrier element and, at the same time, can be tightened or secured by the user by means of a suitable screwdriver.

Preferably, the at least one threaded screw has a countersunk head realized substantially correspondingly to the chamfer of the longitudinal slot and to the countersink of the through bore. As a result, the at least one threaded screw is able to be screwed sufficiently far into the fastening bores of the groove bottom to enable a secure fit. Alternatively, threaded screws having a cylinder head can also be used.

In a technical refinement, it is provided that the at least one threaded screw has an axial length such that the at least one threaded screw is constantly in threaded engagement with the associated threaded bore. As a result, the threaded screws, irrespective of the degree of tightening, are reliably secured against falling out of the groove. The threaded screws are able to be unscrewed sufficiently far out of the threaded bores of the groove to the point where their heads butt against the bottom side of the base plate, which is preferably the case approximately after 2 to 3 revolutions. A fast and secure fastening of the edge guide is consequently given.

Preferably, the annular base plate is formed with a transparent plastic. By virtue of the transparency of the base plate, the introduction of the fastening portion into the groove of the annular end portion of the carrier element of the supporting device, and the tightening or securement of the threaded screws, is further facilitated for a user.

In an advantageous refinement, it is provided that the countersunk head of the at least one threaded screw, for the securement by means of the tool, has a drive geometry in the style of a cross slot, a hexalobular internal drive or a polygonal socket drive for the tool. The edge guide is hence compatible with a multiplicity of different tools of the user if threaded screws having appropriate drive geometries accompany the edge guide or the tool system.

In addition, the disclosure relates to an edge guide for guiding a hand-held power tool along an edge of a workpiece, said edge guide comprising a holding arm. The holding arm has a fastening portion in which is configured at least one through bore for an associated threaded screw. The at least one through bore merges into a longitudinal slot which is open toward a holding arm end, wherein the longitudinal slot has a V-shaped chamfer and the at least one through bore has a countersink. Consequently, a simple and, at the same time, robust fastening of the edge guide to such a hand-held power tool, in particular a router, is possible.

The disclosure further relates to a tool system comprising an above-described hand-held power tool and comprising an above-described edge guide. The tool system thus allows a user reliably reproducible and dimensionally stable work results in the machining of workpieces made of wood or plastic.

BRIEF DESCRIPTION OF THE DRAWINGS

The disclosure is explained in greater detail in the following description on the basis of illustrative embodiments represented in the drawings, in which.

DETAILED DESCRIPTION

Figure 1:
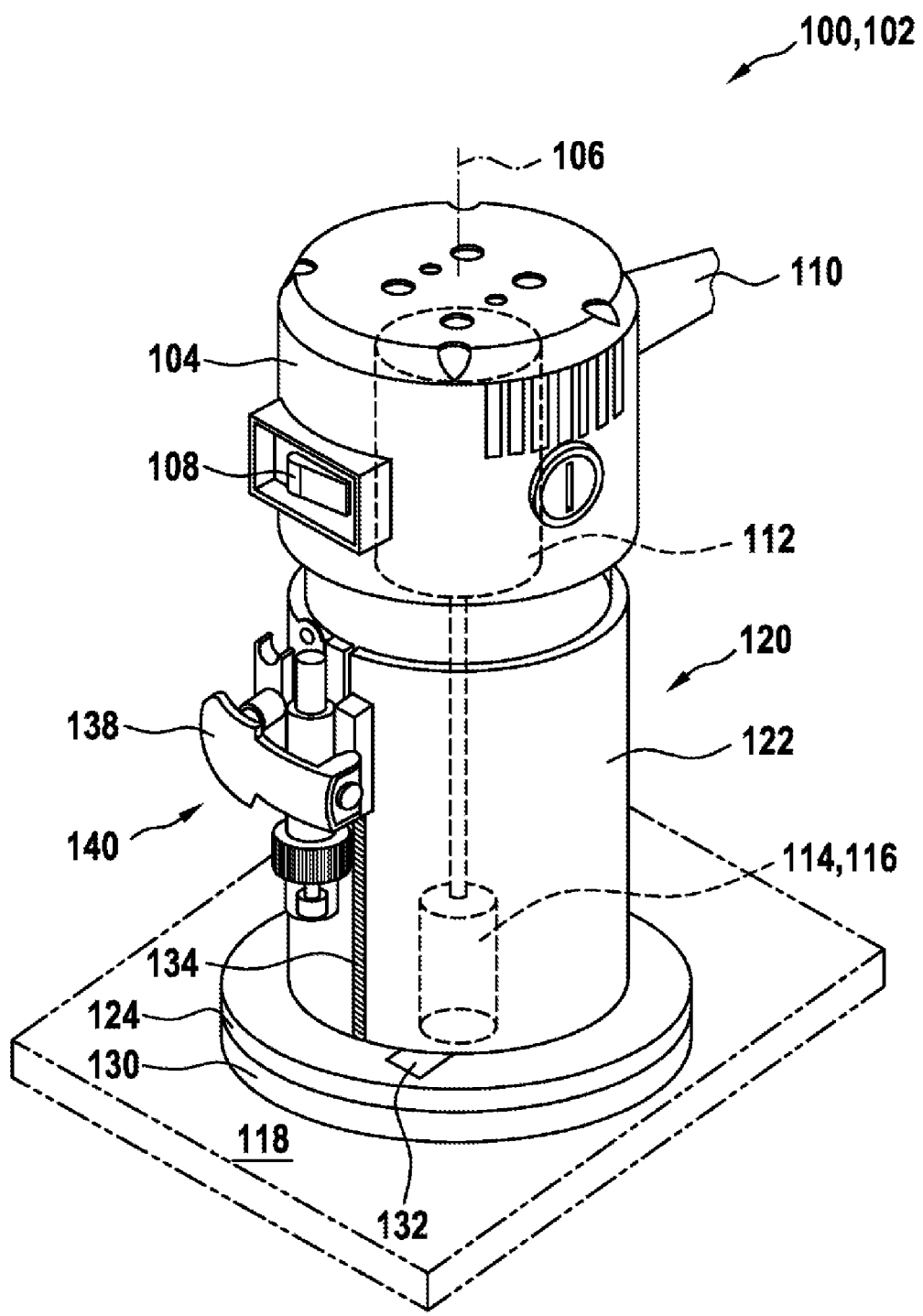
FIG. 1 shows a perspective view of a hand-held power tool realized, by way of example, as a router.

FIG. 1 shows a hand-held power tool 100, which is configured, by way of example, as a router 102, and preferably possesses a machine housing 104. The machine housing 104 has, by way of illustration, a longitudinal axis 106, and is configured, purely by way of example, at least approximately cylindrically. In addition, the hand-held power tool 100 possesses, by way of example, a mains switch 108 and an electrical mains supply line 110. At this point, however, it should be pointed out that the present disclosure is not limited to a hand-guided router 102 which is operable in dependence on the mains network, but can also be used in routers which can be operated independently from the mains network and which, for the electricity supply, can be connected mechanically and electrically, for example, to an associated battery pack, or which possess a pneumatic drive.

By means of a here, by way of example, electric drive motor 112, an insert tool 114 can be rotationally driven, wherein the insert tool 114, here merely by way of example, is configured as a substantially cylindrical milling tool 116. For the precisest possible, preferably plane-parallel guidance of the router 102 on a, for example, plate-like, preferably flat, workpiece 118, the router preferably possesses a supporting device 120 comprising a carrier element 122 for the at least partial accommodation of the machine housing 104. The carrier element 122 is here, purely by way of example, of at least substantially hollow-cylindrical configuration.

On an end flange 124 of the carrier element 122 of the supporting device 120, which end flange is preferably annular and is facing toward the workpiece 118, a, by way of example, likewise approximately annular base plate 130 is preferably likewise configured with a recess 132 which allows the insert tool 114 or the milling tool 116 to pass through onto the workpiece 118. The annular end flange 124 of the carrier element 122 here runs, merely by way of example, at right angles to the longitudinal axis 106 of the machine housing 104. Moreover, to the end flange 124 of the carrier element 122 is fastened by means of fastening elements (not represented here), such as, for example, threaded screws or the like, the base plate 130, which is provided as a direct bearing surface for the workpiece 118. The substantially hollow-cylindrical carrier element 122 preferably possesses a continuous longitudinal slot 134, which runs parallel to the longitudinal axis 106 of the machine housing 104. By virtue of the axial longitudinal slot 134, the carrier element 122 of the supporting device 120 possesses in the peripheral direction a sufficiently high resilient elasticity, so that the carrier element 122 of the supporting device 120 can be tightly clamped on the machine housing 104, for example by means of a clamping lever 138 of a clamping device 140, at almost any chosen axial position. From the prior art, the clamping device 140 is sufficiently familiar to the person skilled in the art active in the field of hand-held power tools, so that, for the purpose of conciseness and brevity of the description, a more detailed representation of the design-related details is dispensed with.

Figure 2:
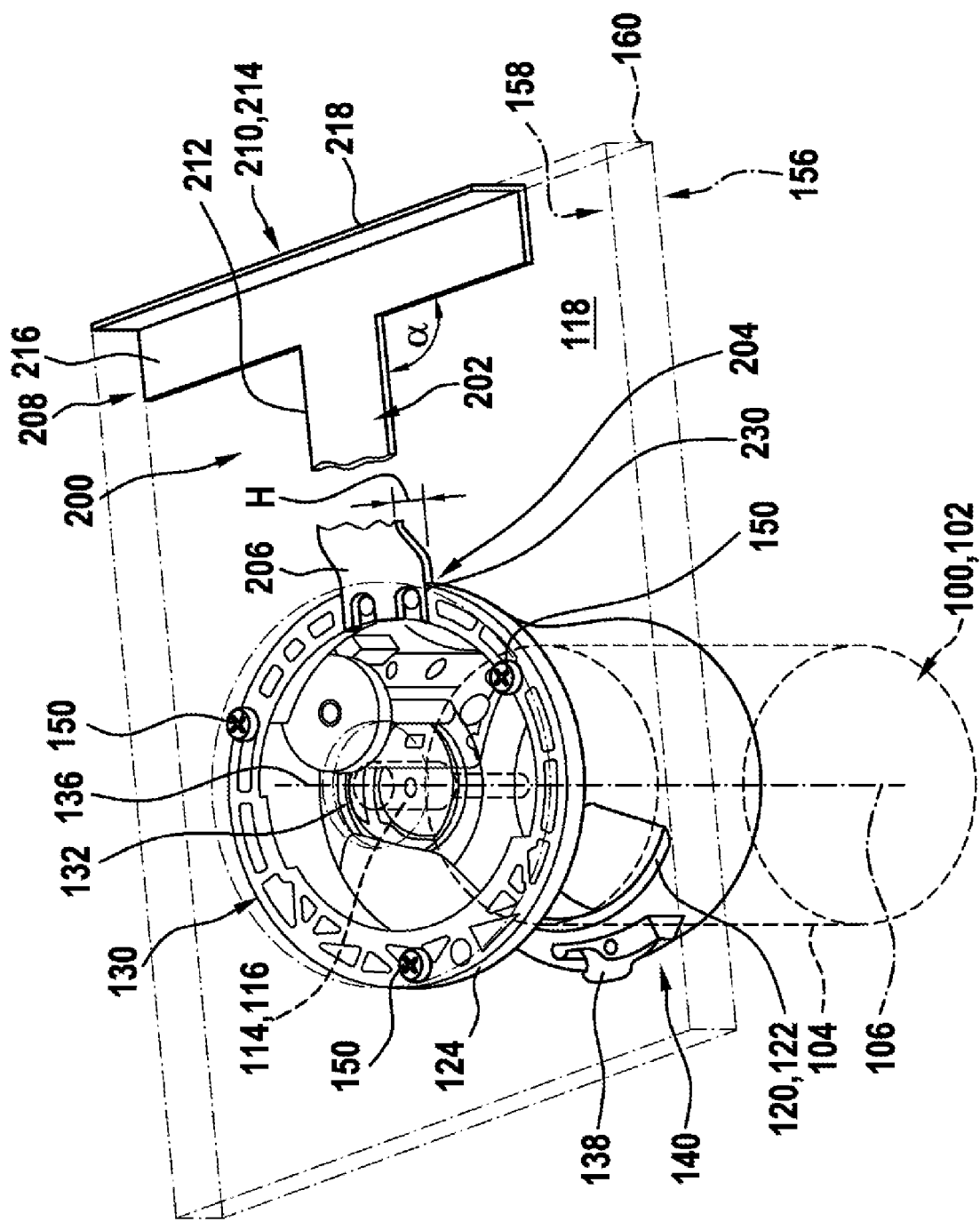
FIG. 2 shows a perspective bottom view of the router with the supporting device of FIG. 1 and a thereto fastened edge guide.

FIG. 2 shows the router 102 with the supporting device 120 from FIG. 1, and a thereto fastened edge guide 200. The machine housing 104, indicated merely with dashed lines, of the hand-held power tool 100 realized as a router 102 is preferably axially fixed in the carrier element 122 of the supporting device 120 by means of the clamping lever 138 of the clamping device 140. The annular end flange 124 is fixedly connected to the likewise annular base plate 130, here merely by way of example, with the aid of three fastening elements of identical design realized as threaded screws 150. The base plate 130, preferably formed with an at least partially transparent or translucent plastic, possesses, for the access of the milling tool 116 to the plate-like workpiece 118, a recess 132, which is arranged centrically to said workpiece and is here, by way of illustration, circular. A rotation axis 136 of the insert tool 114 is preferably configured centric to the circular recess 132 in the base plate 130 and centric to the longitudinal axis 106 of the machine housing 104.

Unlike in FIG. 2, the rotation axis 136 of the insert tool 114 and the longitudinal axis 106 of the machine housing 104 also run in offset arrangement parallel to one another. The base plate 130 made of the transparent plastic bears, ideally squarely, against a top side 156 of the workpiece 118, whereby a precise horizontal guidance of the router in relation to the workpiece 118 is given. In the representation of FIG. 1, a bottom side 158, running parallel to the top side 156, of the plate-like or cuboid workpiece 118 faces upward, out of the drawing plane.

To the end flange 124 of the carrier element 122 of the supporting device 120 is fastened an edge guide 200 according to the disclosure for the precise, preferably parallel or plane-parallel guidance of the router 102 along a straight edge 160 of the workpiece 118. For this purpose, the supporting device 200 of the router 102 has inter alia a holding arm 202, which is directed radially outward in relation to the machine housing 104, and on the first holding arm end 204 of which, situated on the machine side, is shaped a cranked fastening portion 206, and on the second holding arm end 208 of which, directed away from the first holding arm end 204, is provided a guide portion 210. Between the fastening portion 206 and the guide portion 210 preferably runs a plane middle portion 212, which has the geometry of a plane, rectangular flat profile.

The guide portion 210 of the holding arm 202 is formed with a preferably L-shaped profile 214, which is configured at the second holding arm end 208 at an angle α of here, by way of example, 90°. A first leg 216 of the L-shaped profile 210 bears against the top side 156 of the workpiece 118, and a second leg 218 bears against the edge 160 of the workpiece 118, whereby a precise edge guidance of the router 102 is ensured. Between the fastening portion 206 and the middle portion 212 of the holding arm 202, such a vertical offset H formed by bending in this case exists, wherein the first leg 216 terminates flush with the base plate 130, which likewise bears against the top side 156 of the workpiece 118. The two legs 216, 218 here merely approximately have an equal leg length, yet can also possess an unequal leg length.

For the accommodation of the fastening portion 206 of the holding arm 202, in the end flange 124 of the carrier element 122 of the supporting device 120 is preferably configured a radially continuous groove 230. The groove walls of the groove 230, which, for the sake of better diagrammatic clarity, are not labeled here, preferably run parallel to one another at respectively equal distance from the rotation axis 136 of the insert tool 114 or centrally to the recess 132 within the base plate 130. The locking of the fastening portion 206 of the holding arm 202 of the edge guide 200 on the end flange 124 of the supporting device is preferably realized with the aid of two fastening elements (not illustrated), such as threaded screws or the like.

Figure 3:
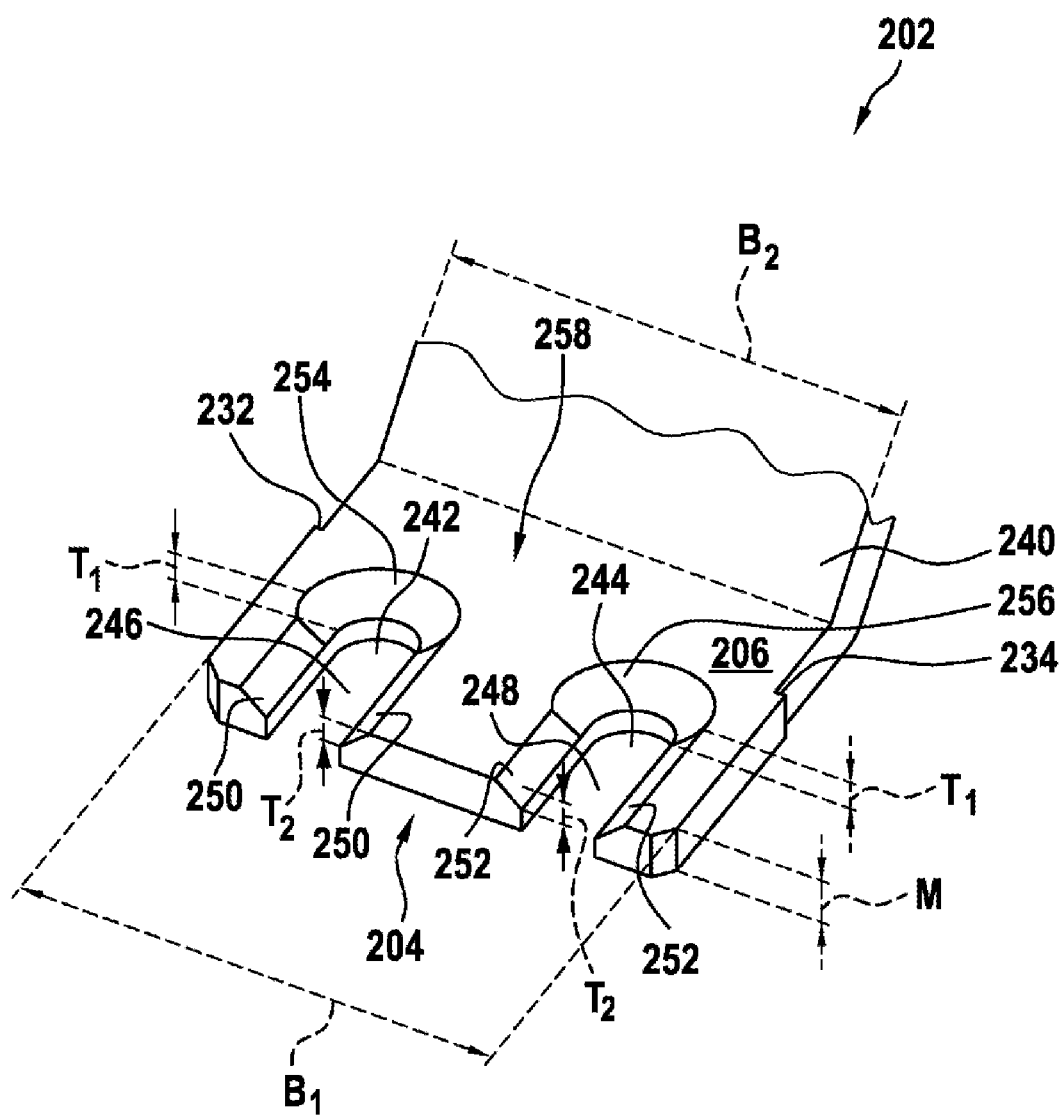
FIG. 3 shows a heavily enlarged perspective view of a fastening portion of a holding arm of the edge guide of FIG. 2.

FIG. 3 shows the fastening portion 206 of the edge guide 200 of FIG. 2. Preferably, a width $B_1$ of the fastening portion 206, with the creation of preferably two small, respectively preferably equally wide shoulders 232, 234, is greater than a width $B_2$ of a cranked portion 240 of the holding arm 202. The fastening portion 206 of the holding arm 202 here has, merely by way of example, two cylindrical through bores 242, 244 for two fastening elements (not represented here).

Each through bore 242, 244 preferably continues in an axial longitudinal slot 246, 248 which is open toward the first holding arm end 204. Each longitudinal slot 246, 248 preferably possesses an approximately V-shaped chamfer 250, 252, and each of the two through bores 242, 244 preferably possesses a countersink 254, 256. The respectively preferably channel-like V-shaped chamfers 250, 252 of the two longitudinal slots 246, 248, and the two roughly semicircular extending countersinks 254, 256 of the through bores 242, 244, are preferably respectively made in a bottom side 258 of the fastening portion 206 of the holding arm 202. A depth $T_1$ of the two countersinks 254, 256 of the through bores 242, 244 is preferably respectively dimensioned slightly larger than a depth $T_2$ of the longitudinal slots 246, 248 which serve for the threading of the fastening elements into the two through bores 242, 244. The process of inserting the fastening portion 206 of the holding arm 202 into the groove of the end flange 124 of the supporting device 120 of the router 102 is hence facilitated, since preferably countersunk heads of the fastening elements can slide into the countersinks 254, 256. In order to achieve this aim, the depth $T_1$ of the two countersinks 254, 256 of the through bores 242, 244 is preferably dimensioned about 0.5 mm to 1.0 mm larger than the depth $T_2$ of the bilateral V-shaped chamfers 250, 252 of the longitudinal slots 246, 248, i.e. $T_2-T_1=0.5$ to 1.0 mm.

Moreover, the holding arm 202 has in the region of the fastening portion 206, by way of illustration, a material thickness of M. Countersinking angles of the countersinks 254, 256, which angles, for the sake of better diagrammatic clarity, are not labeled, and chamfer angles 250, 252 of the V-shaped chamfers, which angles, for the sake of better diagrammatic clarity, are likewise not labeled, here preferably respectively measure approximately 45°, yet can in principle have any angular value between 30° and 60°.

Figure 4:
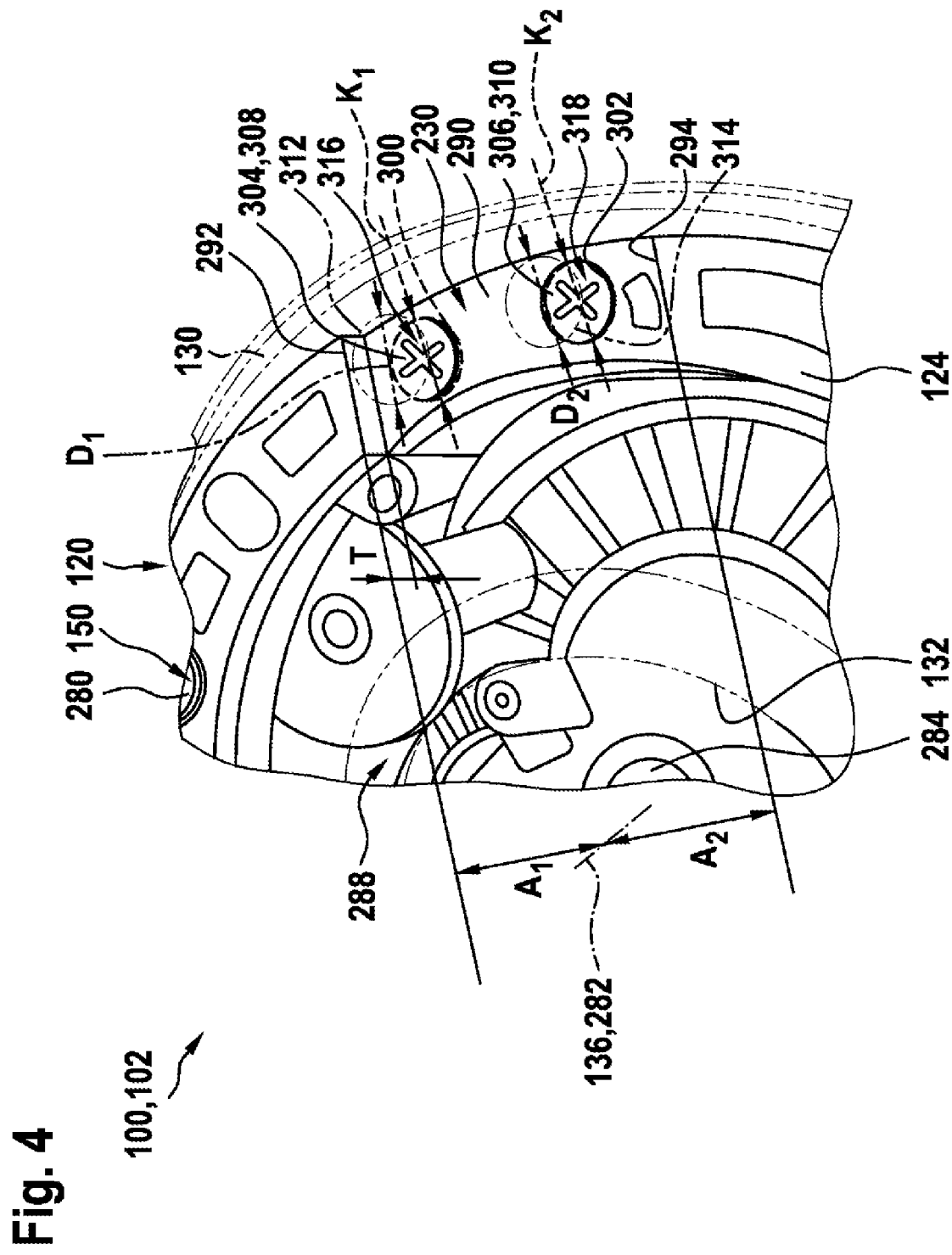
FIG. 4 shows a perspective partial view of an annular end flange of the supporting device of FIG. 1 from below, with a thereto fastened, annular base plate, a groove and threaded screws screwed therein.

FIG. 4 shows the end flange 124 of the supporting device 120, and the base plate 130, of FIGS. 1 and 2. The base plate 130, which is formed with a preferably transparent plastic and is preferably substantially annular, is preferably tightly screwed to the preferably likewise annular end flange 124, by means of the threaded screw 150 and at least two further threaded screws which are structurally identical though not represented here. A rotary axis 282 of a tool holder 284 realized in the style of a chuck is here arranged, by way of example, centrically in relation to the recess 132 of the base plate 130, which recess, in turn, is preferably centrically fastened to the end flange 124 of the supporting device 120 of the hand-held power tool 100 realized as a router 102. The rotary axis 282 of the tool holder 284 preferably coincides with the rotation axis 136 of the insert tool. Both the rotation axis 136 and the rotary axis 282 are here, by way of example, oriented perpendicular to the base plate 130, and hence in relation to the top side of the plate-like workpiece to be machined. A head 280 of the threaded screw 150, and the heads of the at least two further threaded screws (not represented) which serve to fasten the base plate 130, preferably likewise terminate flush with a top side 288 of the base plate 130, which top side bears against the workpiece to be machined, or are at least slightly recessed into said top side in order to preclude damaging of the workpiece.

Into the end flange 124 is preferably sunk the radially continuous groove 230 having an axial depth of T. The axial depth T of the groove 230 is in this case preferably dimensioned such that it is at least slightly larger than the material thickness M of the fastening portion 206 of FIG. 3 of the holding arm 202 of FIG. 3, in order to enable a smooth insertion process. The groove 230 preferably possesses an approximately rectangular cross-sectional geometry having a preferably plane groove bottom 290, and preferably two groove walls 292, 294 running perpendicular to the groove bottom 290. The two groove walls 292, 294 preferably run parallel to one another and respectively have approximately an equally large distance $A_1$, $A_2$ from the rotary axis 282 of the tool holder 284 or the rotation axis 136 of the insert tool.

For the temporary fastening of the holding arm 202 of the edge guide 200 (here likewise not represented) of FIG. 2 to the end flange 124 of the supporting device 120 are provided in the groove bottom 290, here merely by way of example, two non-continuous threaded blind bores 300, 302. In the two threaded bores 300, 302 is here respectively made one of two fastening elements 304, 306, which here, merely by way of example, are respectively realized with a threaded screw 308, 310.

For the tightening or securement of the threaded screws 308, 310, the base plate 130 preferably has two cylindrical through bores 312, 314, which are identically configured congruently thereto and the diameter $D_1$, $D_2$ of which is preferably respectively at least slightly smaller than the respective head diameters $K_1$, $K_2$ of the two threaded screws 308, 310, yet which is preferably specifically still sufficiently large that a shank of a hand-held tool (not illustrated) that serves to tighten the threaded screws 304, 306, such as, for example, a screwdriver or the like, can pass through the through bores 312, 314 within the transparent base plate. Consequently, nor can threaded screws 308, 310 which have been unscrewed or partially loosened from the threaded bores 300, 302 fall out of the groove 230 and get lost. The two diameters $D_1$, $D_2$, and the diameters $K_1$, $K_2$, are preferably respectively equally large.

In principle, for the fastening of the holding arm 202 of the edge guide 200 to the end flange 124 of the supporting device 120, one threaded screw is sufficient. From the viewpoint of twist-proofness and in order to ensure a play-free fastening of the holding arm 202 to the end flange 124 even under higher mechanical loads, a configuration comprising at least two threaded screws or fastening elements is, however, to be preferred.

The two threaded screws 308, 310 preferably respectively have a countersunk head 316, 318, the conicity of which preferably corresponds with the V-shaped chamfers of the longitudinal slots 246, 248 of FIG. 3 and of the countersinks 254, 256 of FIG. 3 of the through bore 242, 244 of FIG. 3 in the fastening portion 206 of the holding arm 202, so that a mechanically particularly durable connection is formed. In the illustrative embodiment of FIG. 4, the countersunk heads 316, 318 of the two threaded screws 308, 310 have, merely by way of example, a drive geometry in the form of the known cross slot (so-called Pozidriv®).

Figure 5:
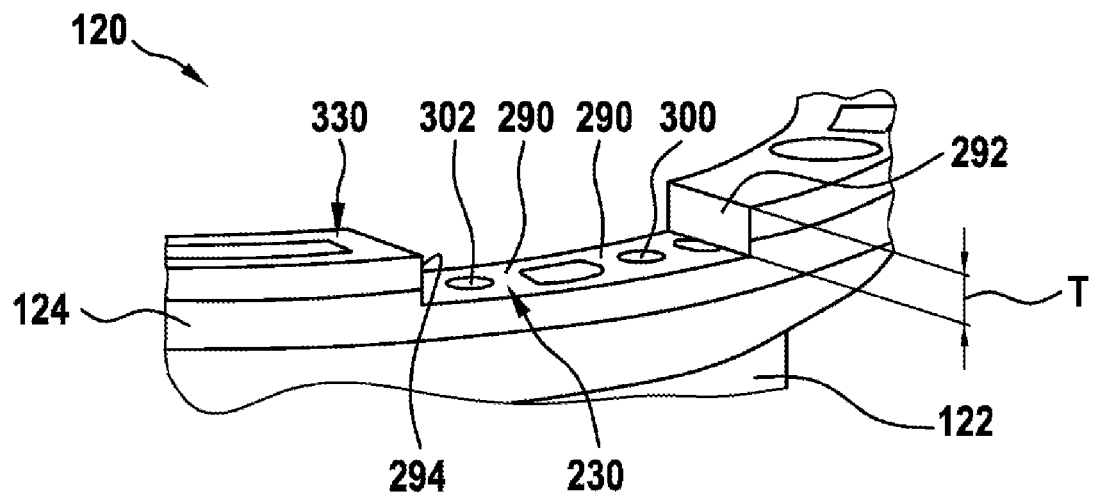
FIG. 5 shows a perspective partial view of the annular end flange of FIG. 3, with two threaded bores for the threaded screws.

FIG. 5 shows a perspective partial view of the annular end flange 124 of FIG. 3, comprising two threaded bores for the threaded screws. Within the substantially solid end flange 124 of the approximately hollow-cylindrical carrier element 122 of the supporting device 120, the radially continuous groove 230 is configured with the two groove walls 292, 294 running perpendicular to the groove bottom 290. The axial depth T of the groove 230 is defined as the axial distance between the groove bottom 290 and an annularly encompassing bottom side 330 of the end flange 124, wherein to the bottom side 330 of the end flange 124 is fastened the transparent base plate (not represented here) of the supporting device 120.

In the groove bottom 290 are made the two threaded bores 300, 302, preferably at a distance apart which is circumferentially as large as possible, in order to ensure a reliable fastening of the holding arm of the edge guide to the end flange 124 of the support element 122 of the supporting device 120 with the aid of the fastening elements or threaded screws (not illustrated here).

Figure 6:
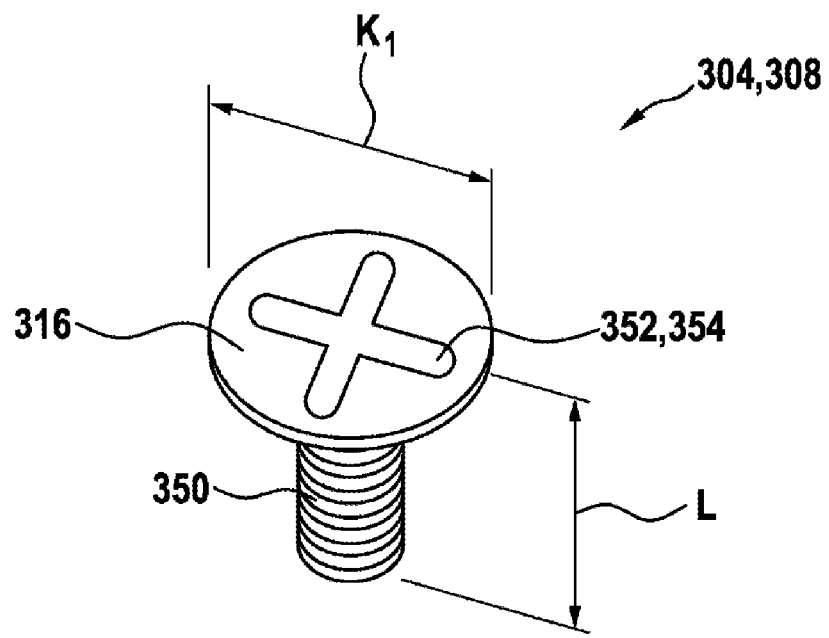
FIG. 6 shows a perspective partial view of one of the threaded screws of FIG. 4.

FIG. 6 shows the threaded screws of FIG. 4. The fastening element 304 configured as the first threaded screw 308 preferably has a substantially cylindrical shank 350, which is provided with a, for instance, metric thread, which can be screwed respectively into one of the threaded bores 300, 302 of FIG. 5 within the end flange 124 of FIG. 5 of the supporting device 120. A conicity of the countersunk head 316 of the threaded screw 308 preferably corresponds with the V-shaped chamfers of the longitudinal slots 246, 248 and of the countersinks of the through bores 254, 256 in the fastening portion 206 of the holding arm 202 of the edge guide 200. A diameter $K_2$ of the countersunk head 316 of the threaded screw 308 is preferably dimensioned such that the countersunk head 316, in that state of the threaded screw 308 in which it is screwed fully into the threaded bore of the end flange 124 of the supporting device 120, terminates at least flush with the bottom side of the fastening portion 206 of the holding arm 202, or can be recessed fully into the countersink 254, 256 of a through bore 242, 244 (cf. FIG. 3).

An axial length L of the threaded screw 308, or an axial length L of the shank 350 of the threaded screw 308, is preferably dimensioned such that, in the fully loosened or unscrewed state of the threaded screw 308, a threaded engagement of two to three thread turns also persists between the threaded screw 308 and the associated threaded bore. By continued loosening of the threaded screw 308, this can at most butt against the bottom side of the transparent base plate. A further loosening of the threaded screw 308 by the user is thus virtually impossible. A situation in which the threaded screw 308 falls out of the end flange 124 of the supporting device 120 is hence reliably avoided.

A drive geometry 352 of the threaded screw 308 is here realized, merely by way of example, in the style of a cross slot 354 (so-called Pozidriv®). In order to enable higher tightening torques, the threaded screw 308 can also have a drive geometry in the style of a hexalobular internal drive (so-called Torx®) or a polygonal socket drive (Inbus®), or a different drive geometry. The preferably second threaded screw, which serves to fasten the holding arm 202 of the edge guide 200 to the inner flange of the supporting device 120 of the router, is preferably identical in design to the threaded screw 308 described here in detail.

The invention claimed is:

1. A hand-held power tool, comprising:
   a machine housing;
   a supporting device configured to guide the hand-held power tool on a workpiece, the supporting device including a carrier element, in which the machine housing is at least in part accommodated and fastened, the carrier element including an end flange facing away from the machine housing, the end flange defining a groove; and
   a base plate fastened to the end flange, the base plate configured to bear against a workpiece and to enable an insert tool to pass through the base plate,
   wherein:
      the groove in the end flange is configured to at least in part accommodate a fastening portion of a holding arm of an edge guide in a positive-locking manner;
      the hand-held power tool includes at least one threaded screw engaged with a corresponding at least one threaded bore extending into the end flange from a bottom of the groove, the at least one threaded screw configured to temporarily fasten the holding arm in the groove;
      the base plate defines at least one through bore configured for a tool to pass through for operating the at least one threaded screw; and
      a diameter of the at least one through bore is smaller than a head diameter of the at least one threaded screw.

2. The hand-held power tool as claimed in claim 1, wherein a depth of the groove is dimensioned larger than a material thickness of the fastening portion of the holding arm.

3. The hand-held power tool as claimed in claim 1, wherein:
   each of the at least one through bores of the base plate is configured centrically and above an associated one of the at least one threaded bore.

4. The hand-held power tool as claimed in claim 1, wherein:
   the fastening portion of the holding arm defines at least one through bore configured to receive a respective one of the at least one threaded screws, each of the at least one through bores of the fastening portion merging into a respective one of at least one longitudinal slot which is open toward a holding arm end;
   the at least one longitudinal slot has a V-shaped chamfer and the at least one through bore of the fastening portion has a countersink;
   the at least one threaded screw has a countersunk head configured to substantially correspond to (i) the chamfer of a corresponding one of the at least one longitudinal slot so as to slide along the corresponding one of the at least one longitudinal slot, and (ii) the countersink of the at least one through bore of the fastening portion.

5. The hand-held power tool as claimed in claim 1, wherein:
   the at least one threaded screw has an axial length; and
   the axial length and the head of the at least one threaded screw are configured such that with the at least one threaded screw fully loosened, the head of the at least one threaded screw abuts the base plate with the at least one threaded screw in threaded engagement with the corresponding at least one threaded bore.

6. The hand-held power tool as claimed in claim 4, wherein the base plate is annular and is formed with a transparent plastic.

7. The hand-held power tool as claimed in claim 6, wherein the countersunk head of each threaded screw, has a drive geometry configured to be secured by a tool, the drive geometry configured as a cross slot, a hexalobular internal drive, or a polygonal socket drive.

8. A tool system comprising:
   a hand-held power tool comprising:
      a machine housing; and
      a supporting device for guiding the hand-held power tool on a workpiece, the supporting device including a carrier element, in which the machine housing is at least in part accommodated and fastened, the carrier element including an end flange facing away from the machine housing, the end flange defining a groove; and
   a base plate fastened to the end flange, the base plate configured to bear against a workpiece and to enable an insert tool to pass through the base plate; and
   an edge guide configured for guiding the hand-held power tool along an edge of the workpiece and configured to be fastened to the end flange, the edge guide comprising a holding arm having a fastening portion configured to be at least in part accommodated in a positive-locking manner in the groove, the fastening portion defining at least one through bore for an associated threaded screw that is configured to fasten the fastening portion to the end flange,
   wherein the at least one through bore merges into a longitudinal slot which is open toward a holding arm end, and
   wherein the longitudinal slot has a V-shaped chamfer and the at least one through bore has a countersink;
   wherein the associated threaded screw is engaged in a threaded bore extending into the end flange from a bottom of the groove and has an axial length; the axial length and the head of the associated threaded screw are configured such that with the associated threaded screw fully loosened, the head of the at least one threaded screw abuts the base plate with the associated threaded screw in threaded engagement with the threaded bore;
   wherein the base plate defines a through bore configured for a tool to pass through for operating the associated threaded screw; and a diameter of the base plate through bore is smaller than a head diameter of the associated screw.

9. The hand-held power tool as claimed in claim 1, wherein the hand-held power tool is a router.

10. The tool system of claim 8, wherein the countersink is deeper than the chamfer.

11. The tool system of claim 8, wherein:
    the chamfer and countersink are arranged in a region of a bottom side of the fastening portion of the holding arm that faces away from the machine housing.

* * * * *